United States Patent
Xiao

(10) Patent No.: US 11,042,053 B1
(45) Date of Patent: Jun. 22, 2021

(54) LIGHT MODULATING METHOD, LIGHT MODULATING DEVICE AND STORAGE MEDIUM

(71) Applicant: TCL China Star Optoelectronics Technology Co., Ltd., Guangdong (CN)

(72) Inventor: Jianfeng Xiao, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 16/626,267

(22) PCT Filed: Dec. 12, 2019

(86) PCT No.: PCT/CN2019/124954
§ 371 (c)(1),
(2) Date: Dec. 23, 2019

(51) Int. Cl.
*G02F 1/133* (2006.01)
*G02F 1/1362* (2006.01)
*G09G 3/36* (2006.01)
*G02F 1/1333* (2006.01)

(52) U.S. Cl.
CPC .... *G02F 1/13306* (2013.01); *G02F 1/136286* (2013.01); *G09G 3/36* (2013.01); *G02F 1/133391* (2021.01); *G09G 2320/02* (2013.01)

(58) Field of Classification Search
CPC ........... G02F 1/13306; G02F 1/136286; G02F 2001/133391; G09G 3/36; G09G 2320/02
See application file for complete search history.

(56) References Cited

U.S. PATENT DOCUMENTS

| | | | |
|---|---|---|---|
| 6,429,839 B1* | 8/2002 | Sakamoto | G09G 3/3406 345/102 |
| 2007/0132711 A1 | 6/2007 | Park et al. | |
| 2009/0109165 A1 | 4/2009 | Park et al. | |
| 2012/0113167 A1* | 5/2012 | Margerm | G09G 3/3426 345/690 |
| 2014/0307011 A1* | 10/2014 | Ninan | G09G 3/36 345/691 |
| 2014/0340000 A1* | 11/2014 | Zhang | H05B 45/37 315/307 |
| 2017/0162116 A1 | 6/2017 | Minami et al. | |

FOREIGN PATENT DOCUMENTS

| | | |
|---|---|---|
| CN | 1811536 A | 8/2006 |
| CN | 1979621 A | 6/2007 |
| CN | 101425275 A | 5/2009 |
| CN | 108962150 A | 12/2018 |
| JP | 2008071672 A | 3/2008 |

* cited by examiner

*Primary Examiner* — Dmitriy Bolotin
(74) *Attorney, Agent, or Firm* — Hamre, Schumann, Mueller & Larson, P.C.

(57) ABSTRACT

The present invention provides a light modulating method, a light modulating device and a storage medium. The method is applied to a display device and includes: acquiring a light modulating instruction; according to the light modulating instruction, partitioning a displaying region of the display device to form a plurality of light modulating regions; and disposing a light modulating signal in each of the light modulating regions; wherein first electrical level duty ratios of the light modulating signals disposed in the light modulating regions are staggered.

7 Claims, 9 Drawing Sheets

LIGHT MODULATING METHOD, LIGHT MODULATING DEVICE AND STORAGE MEDIUM

FIELD OF INVENTION

The present invention relates to a field of display technologies, especially relates to a light modulating method, a light modulating device and a storage medium.

BACKGROUND OF INVENTION

A pulse width modulation (PWM) method of the liquid crystal display panel (LCD) has been applied extensively. The pulse width modulation is to modulate light of the display panel in a constant frequency, and to modulate a width of each pulse to further adjust a duty ratio of a waveform of each pulse waveform.

However, a device in a liquid crystal display panel is irradiated by strong light, a storage capacitor in a pixel unit changes and results in that a charging voltage of liquid crystal in the display panel and a threshold voltage of a driver transistor shifts such that during a PWM modulation the display panel has an over high duty ratio occurring on a waveform of a pulse of a gate line and causing level bar blocks along the gate lines of the LCD and resulting in poor display.

SUMMARY OF INVENTION

Technical Issue

The present invention provides a light modulating method, a light modulating device, and a storage medium. The present invention, by partitioning the displaying region of the display panel, divides a gate line into different light modulating regions, and guarantees pulse start times of light modulating signals of different light modulating regions are different to prevent an over high duty ratio from occurring on the gate line and to mitigate issues of poor display images.

Technical Solution

Technical solutions provided by the present invention are as follows:

An embodiment of the present invention provides a light modulating method applied to a display device, and the light modulating method comprises steps as follows:

acquiring a light modulating instruction; according to the light modulating instruction, partitioning a displaying region of the display device to form a plurality of light modulating regions; and disposing a light modulating signal in each of the light modulating regions; wherein first electrical level duty ratios of the light modulating signals disposed in the light modulating regions are staggered.

The embodiment of the present invention also provides a light modulating device, comprising: an acquisition module, configured to acquire a light modulating instruction; a partitioning module, configured to partition a displaying region of the display panel to form a plurality of light modulating regions according to the light modulating instruction; and a disposing module, configured to dispose a light modulating signal in each of the light modulating regions; wherein first electrical level duty ratios of the light modulating signals disposed in the light modulating regions are staggered.

The present invention also provides a computer readable storage medium, the storage medium is stored with a plurality of instructions, the instructions are configured to be loaded by a processor to implement the light modulating method for displaying images.

Advantages

Advantages of the present invention are as follows: The present invention provides a light modulating method, a light modulating device, and a storage medium, forms a plurality of light modulating regions by partitioning a displaying region of the display panel, and determines a pulse start time of light modulating signals of each of the light modulating regions. The present invention, by partitioning the displaying region, divides a gate line into different light modulating regions, and guarantees pulse start times of light modulating signals of different light modulating regions are different to prevent an over high duty ratio from occurring on the gate line and to mitigate issues of poor display images.

DESCRIPTION OF DRAWINGS

To more clearly elaborate on the technical solutions of embodiments of the present invention or prior art, appended figures necessary for describing the embodiments of the present invention or prior art will be briefly introduced as follows. Apparently, the following appended figures are merely some embodiments of the present invention. A person of ordinary skill in the art may acquire other figures according to the appended figures without any creative effort.

DETAILED DESCRIPTION OF PREFERRED EMBODIMENTS

The technical solution in the embodiment of the present invention will be clearly and completely described below with reference to the accompanying drawings in the embodiments of the present invention. Apparently, the described embodiments are merely some embodiments of the present invention instead of all embodiments. According to the embodiments in the present invention, all other embodiments obtained by those skilled in the art without making any creative effort shall fall within the protection scope of the present invention.

A light modulating method is applied to a display device, and the light modulating method comprises steps as follows: acquiring a light modulating instruction; according to the light modulating instruction, partitioning a displaying region of the display device to form a plurality of light modulating regions; and disposing a light modulating signal in each of the light modulating regions; wherein first electrical level duty ratios of the light modulating signals disposed in the light modulating regions are staggered.

Figure 1:
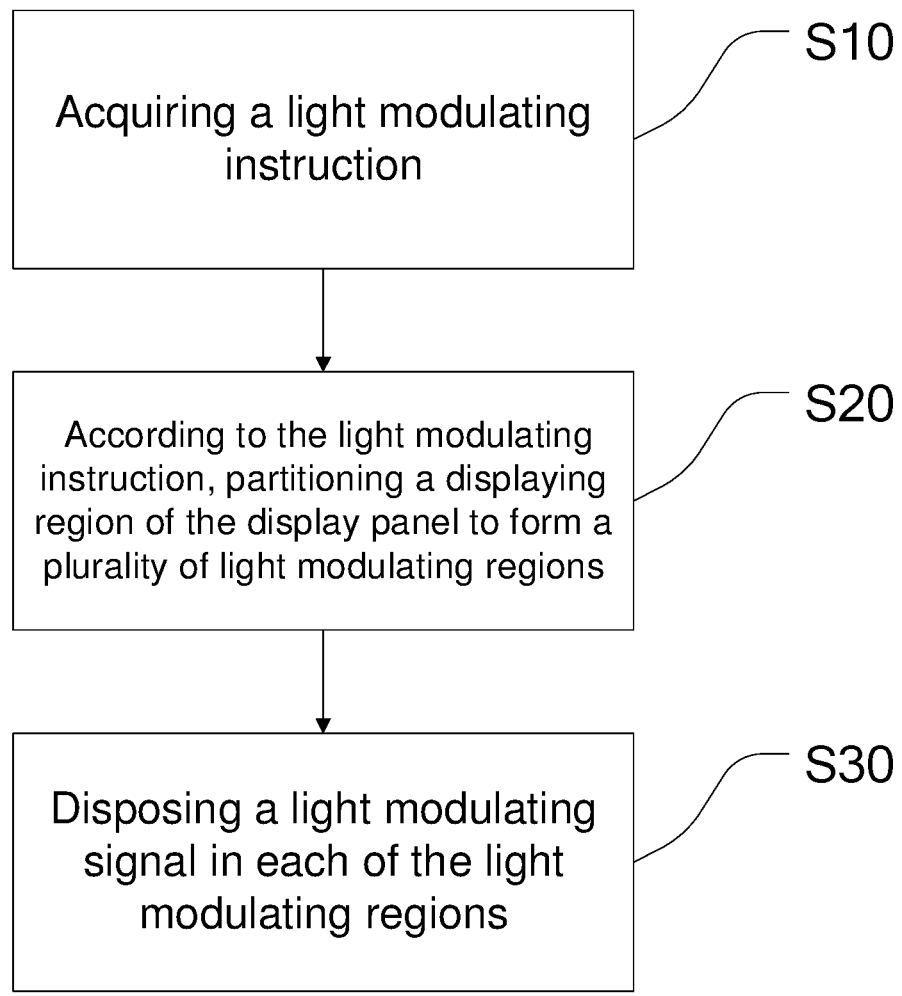
FIG. 1 is a schematic flowchart of a light modulating method provided by an embodiment of the present invention.

With reference to FIG. 1, in FIG. 1, FIG. 1 is a schematic flowchart of a light modulating method provided by an embodiment of the present invention. In the embodiment of the present invention, the light modulating method is applied to a display device, the display device can be a display device such as a smart phone, a tablet, a dashboard, or a computer. Steps of the light modulating method specifically comprises steps S10 to S60 as follows:

The step S10 comprises acquiring a light modulating instruction.

Figure 2:
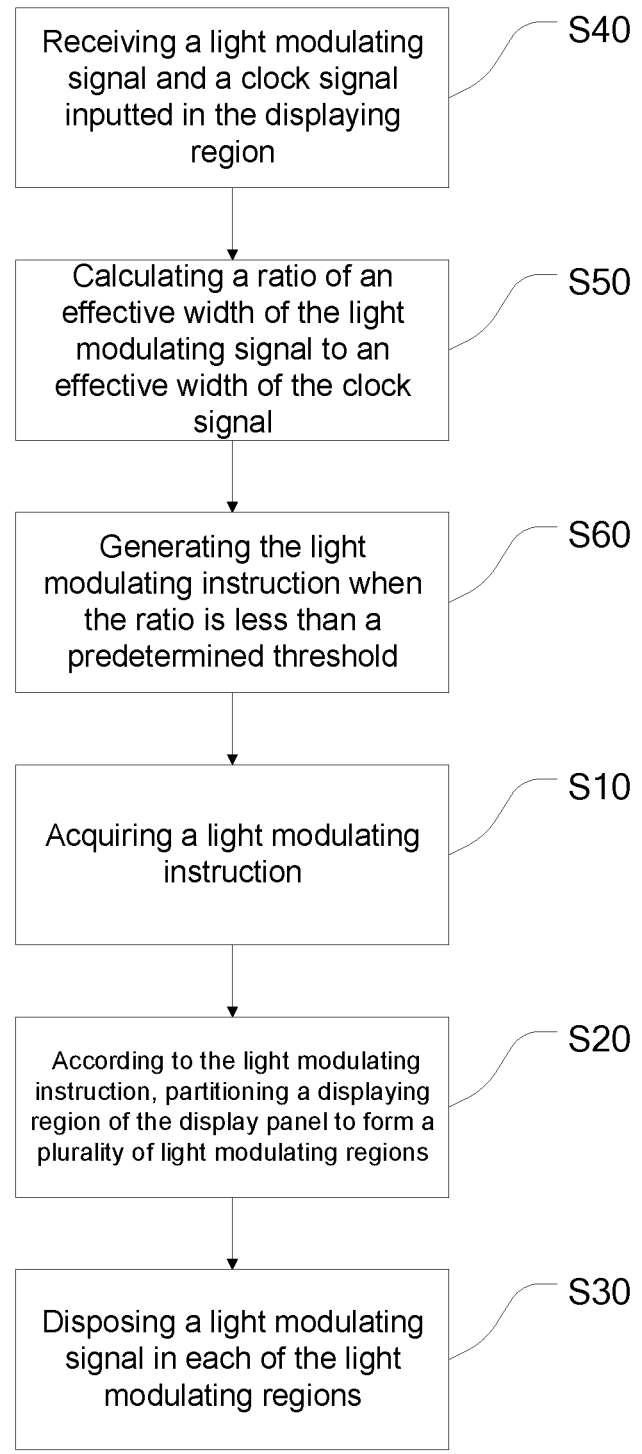
FIG. 2 is a schematic flowchart of a light modulating method provided by the embodiment of the present invention.

Specifically, the light modulating instruction is a light modulating instruction generated under preset conditions before the light modulating method provided by the embodiment of the present invention implements the light modulating method. For example, before the step S10, with reference to FIG. 2 which is a schematic flowchart of a light modulating method provided by the embodiment of the present invention the embodiment of the present invention, the light modulating method further comprises:

The S40 comprises receiving a light modulating signal and a clock signal inputted in the displaying region.

Furthermore, the light modulating signal specifically means a PWM signal outputted by a light emitting diode in a display device, and a high/low electrical level of the PWM signal is configured to to switch on/off a driver circuit outputting a driving voltage or a driving current toward a load. Furthermore, the PWM signal is a pulse signal.

Furthermore, the clock signal specifically means a time signal of the display device controlled by an external timing logic controller, and generally the time signal is a pulse signal.

Specifically, generally a cycle of the light modulating signal is the same as a cycle of a general clock signal, and a time corresponding to a high electrical level of the clock signal comprises a sum of a time corresponding to a high electrical level of the light modulating signal and a time corresponding to a low electrical level of the light modulating signal.

The step S50 comprises calculating a ratio of an effective width of the light modulating signal to an effective width of the clock signal.

Furthermore, the effective width means a pulse width in a waveform corresponding to a signal, which is also called duty cycle. In other words, a current or a voltage corresponding to the signal has a time width of regular variation. Generally, a waveform corresponding to the signal is rectangular wave, triangular wave, jigsaw wave, sine wave, etc., such waveforms have regular variation, especially in a signal waveform of the rectangular waves, the pulse width specifically means a duty ratio, i.e., a ratio of time occupied by a pulse to a total time in a continuous working time.

Specifically, the light modulating signal and the clock signal provided by the embodiment of the present invention are pulse functions of rectangular waves. For example, when a pulse width of the light modulating signal is 1 μs and a cycle of the light modulating signal is 4 μs, an effective width corresponding to the light modulating signal is $1/4=0.25$. When a pulse width of the cycle signal is 4 μs and a cycle of the cycle signal is 5 μs, an effective width corresponding to the cycle signal is $4/5=0.8$. Furthermore, a ratio of the effective width of the light modulating signal to the effective width of the clock signal can be $0.25/0.8=0.3125$.

The S60 comprises generating the light modulating instruction when the ratio is less than a predetermined threshold.

In the embodiment of the present invention, because in a conventional display device, especially a storage capacitor in a pixel unit changes when a device in the liquid crystal display panel is irradiated by a strong light to result in offsets of a liquid crystal charging voltage in the display panel and a threshold voltage of a driver transistor, the embodiment of the present invention can detect the effective width of the light modulating signal and the effective width of the clock signal under the strong irradiation to the display device to calculate a corresponding value as a predetermined threshold provided by the embodiment of the present invention. For example, after detection, when the predetermined threshold is set as 1, and a ratio corresponding to the embodiment of the present invention is 0.3125, it is identified that offsets of the liquid crystal charging voltage of the display device and the threshold voltage of the driver transistor occur, and therefore generation of the light modulating instruction is required to complete later light modulating steps.

Figure 3:
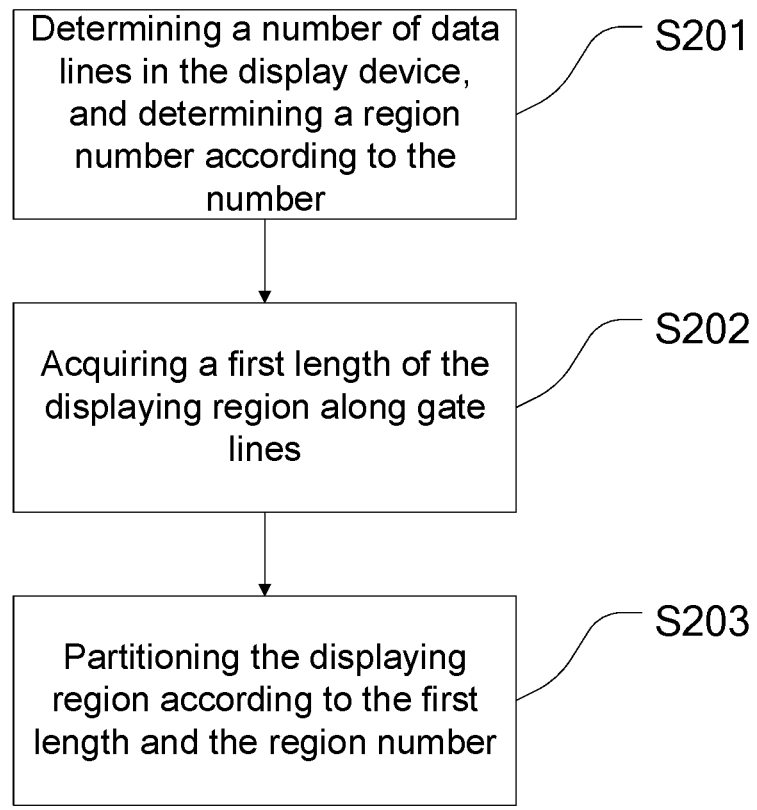
FIG. 3 is a schematic flowchart of a step S20 of a light modulating method provided by the embodiment of the present invention.

The step S20 comprises according to the light modulating instruction, partitioning a displaying region of the display panel to form a plurality of light modulating regions. Specifically, with reference to FIG. 3, FIG. 3 is a schematic flowchart of a step S20 of a light modulating method provided by the embodiment of the present invention. The step S20 specifically comprises steps S201 to S203:

The step S201 comprises determining a number of data lines in the display device, and determining a region number according to the number.

Figure 5:
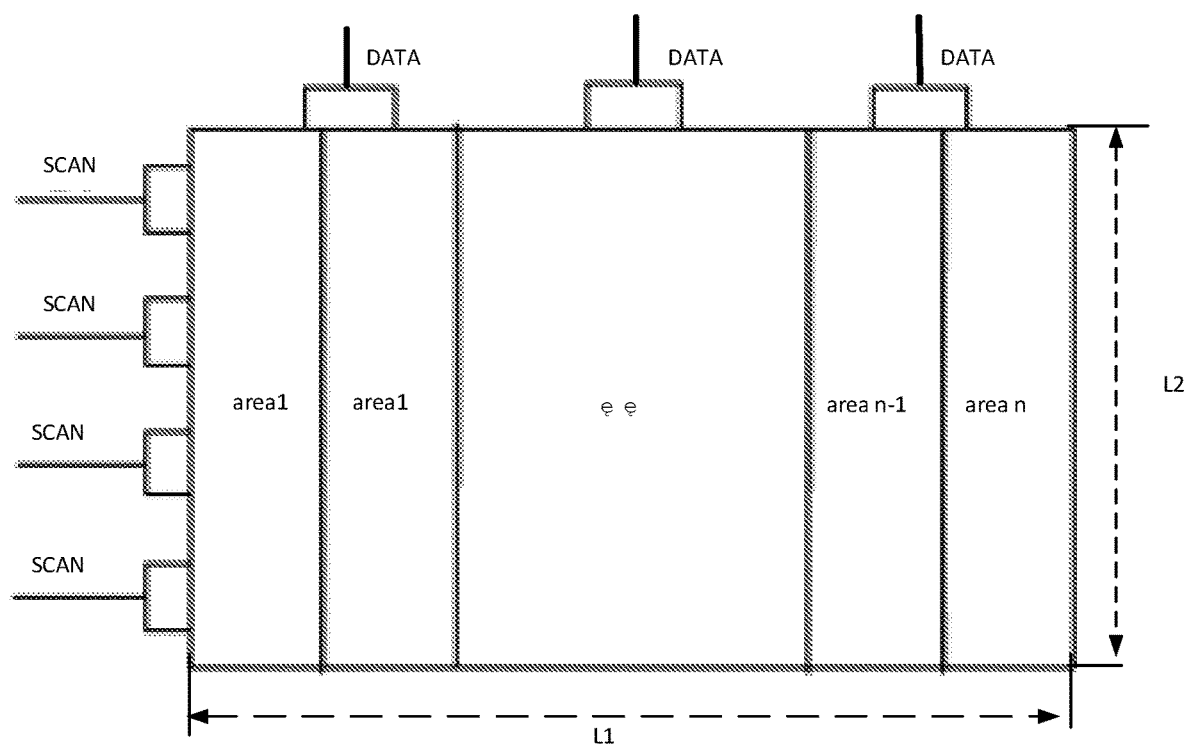
FIG. 5 is a schematic structural view of a display panel provided by the embodiment of the present invention.

Furthermore, with reference to FIG. 5, FIG. 5 is a schematic structural view of a display panel provided by the embodiment of the present invention. Specifically, in the display panel, the displaying region of the display panel is an effective light emitting region of the display panel, the displaying region is disposed transversely with data lines DATA, and the displaying region is disposed longitudinally with scan lines SCAN. Therefore, the number of the data lines DATA in the display panel is determined, and the region number is determined according to the number. In FIG. 5, a plurality of regions of area1, area2, . . . area n−1, area n are classified.

For example, the number of the data lines is identified as 10, the region number of the embodiment of the present invention is identified, and the region number relates to the number of the data lines DATA. Preferably, the region number can correspond to the number of the datalines DATA, for example, the region number is 5, 10, or 20.

The step S202 comprises acquiring a first length of the displaying region along gate lines.

Specifically, the first length along the gate lines in the displaying region is a side length of the displaying region in the display panel, Specifically, with reference to FIG. 5, the first length is a length L1 corresponding to the displaying region.

The step S203 comprises partitioning the displaying region according to the first length and the region number.

For example, when the first length is determined to be 10 cm and the region number is 20, it is calculated that a partition number corresponding to the first length is a common divisor for 20, for example, the common divisor is 5. The displaying region can be divided longitudinally, and a specific schematic dividing view refers to FIG. 5. It should be explained that, to guarantee an excellent effect of the displaying region, the greater region number is better.

Figure 4:
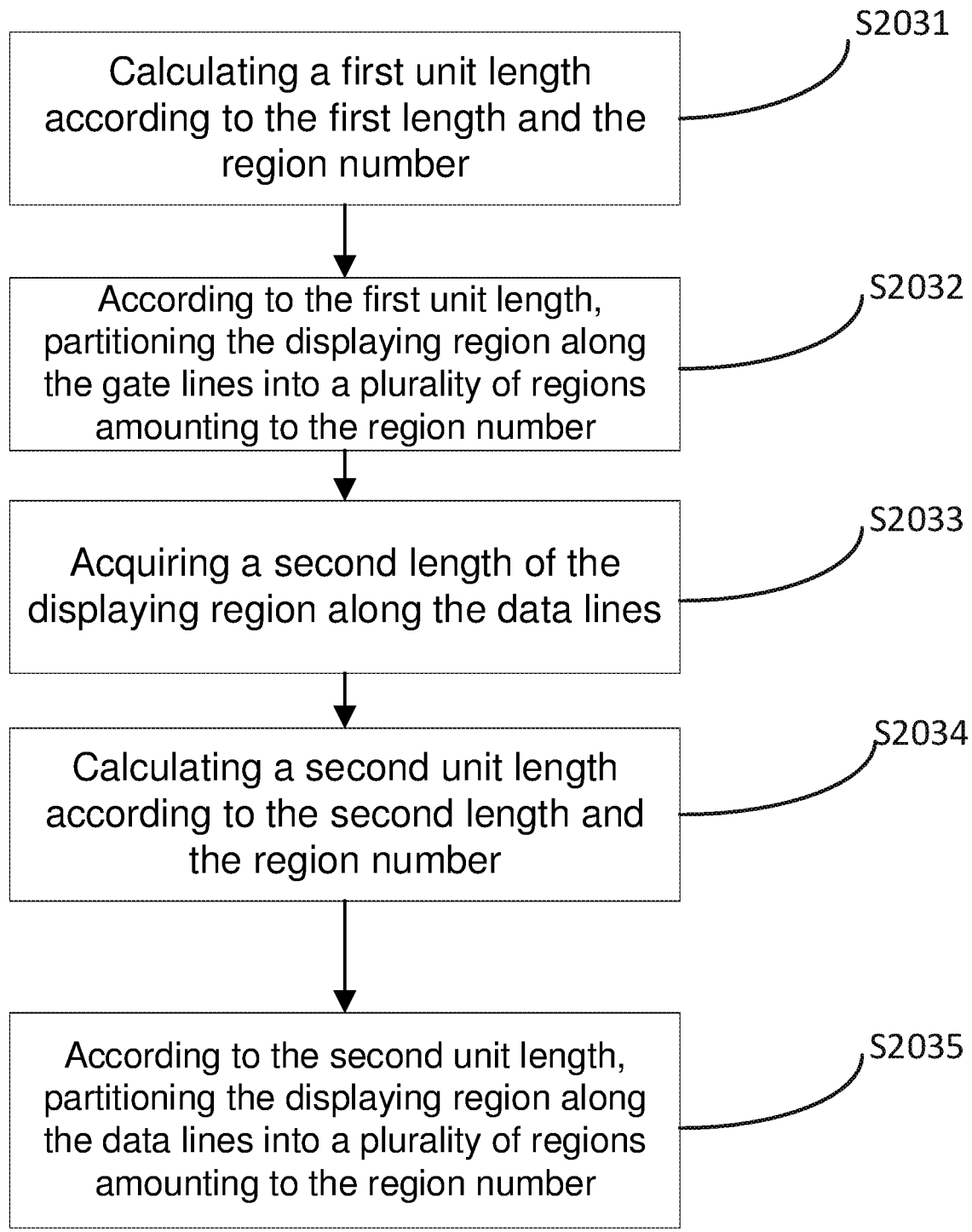
FIG. 4 is a schematic flowchart of a step S203 of a light modulating method provided by the embodiment of the present invention.

Furthermore, with reference to FIG. 4, FIG. 4 is a schematic flowchart of a step S203 of a light modulating method provided by the embodiment of the present invention. The step S203 specifically comprises steps S2031 and S2032:

The step S2031 comprises calculating a first unit length according to the first length and the region number.

For example, when the first length is determined to be 10 cm and the region number is 20, it is calculated that a partition number corresponding to the first length is a common divisor for 20, for example, the common divisor is 5. The displaying region can be equally divided to calculate out the first unit length to be 10/5=2 cm, and a side edge of each of the light modulating regions is 2 cm.

The step S2032 comprises according to the first unit length, partitioning the displaying region along the gate lines into a plurality of regions amounting to the region number.

For example, when the first unit length is determined as 2 cm, the displaying region can be equally divided according to the first length L1 to partition the displaying region along the gate lines into a plurality of regions amounting to the region number.

Besides the step of equal division according to the first length provided by the above embodiment, the step S203 can further comprise steps S2033 to S2035:

The step S2033 comprises acquiring a second length of the displaying region along the datalines.

With reference to FIG. 5, the second length L2 is a length of the displaying region along the gate lines, i.e., the width of the displaying region in FIG. 5.

The step S2034 comprises calculating a second unit length according to the second length and the region number.

In the embodiment, the second unit length is an equally divided unit length corresponding to the embodiment of the present invention. For example, when the second length is 8 cm, the region number is 20, and the partition number corresponding to the first length as determined above is 5, then it is determined that a partition length corresponding to the second length is 20/5=4. Then according to the partition length corresponding to the second unit and the second length, the second unit length is 8/4=2 cm.

The step S2035 comprises according to the second unit length, partitioning the displaying region along the data lines into a plurality of regions amounting to the region number.

Figure 6:
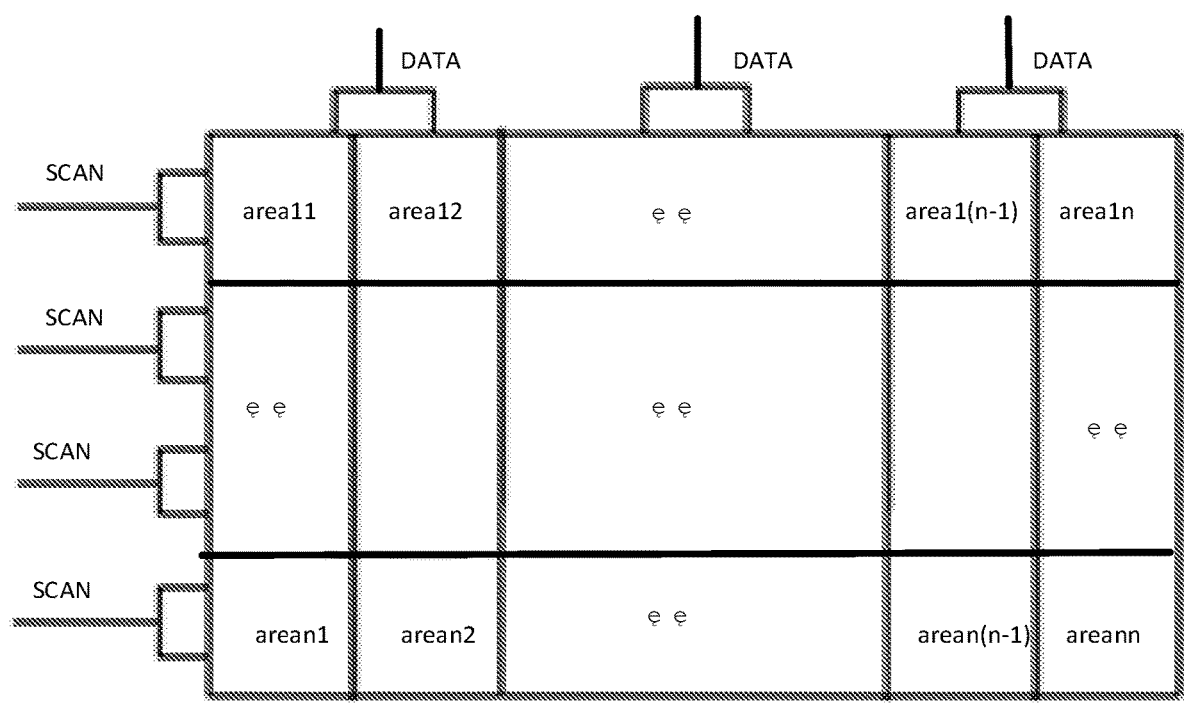
FIG. 6 is another schematic structural view of a display panel provided by the embodiment of the present invention.

Furthermore, a specific partitioning method refers to FIG. 6, FIG. 6 is another schematic structural view of a display panel provided by the embodiment of the present invention. According to the second unit length L2, the displaying region is partitioned along the datalines DATA into a plurality of regions amounting to the region number such that the displaying region is divided into partitions in grids. In the embodiment, a number of scan lines SCAN is combined, when the first unit length is 2 cm, it is calculated that a length corresponding to a unit region of the light modulating regions is 2 cm, and a width corresponding to the unit region 2 cm. The displaying region can be divided into partitions in grids to partition the displaying region. Along the scan lines SCAN the display panel can be divided into area11, area 12, . . . area 1n–1, area1n, and along the data lines DATA, the display panel can be divided into area11, area21, . . . area (n–1) 1, area n1.

The step S30 comprises disposing a light modulating signal in each of the light modulating regions.

First electrical level duty ratios of the light modulating signals disposed in the light modulating regions are staggered.

Figure 7:
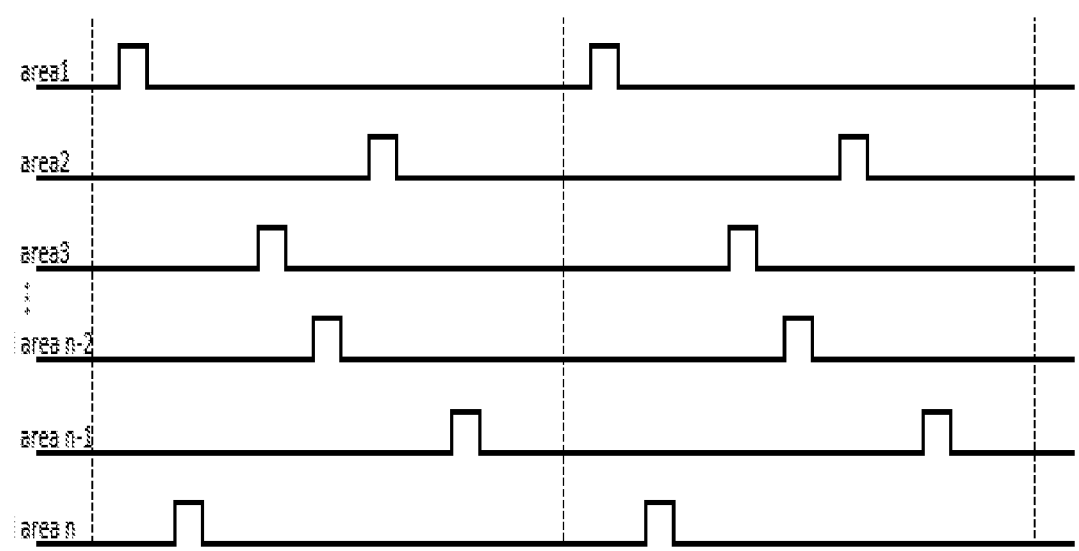
FIG. 7 is a schematic time chart of a light modulating signal of the embodiment of the present invention.

Furthermore, with reference to FIG. 7, FIG. 7 is a schematic time chart of a light modulating signal of the embodiment of the present invention. A high/low electrical level of the light modulating signal switch on/off a driver circuit outputting a driving voltage or a driving current toward a load. Specifically, when the light modulating signal is in the high electrical level, the displaying region emits light. Specifically, a raising time of the high electrical level is a pulse start time of the light modulating signal.

For example, when the region number is set as n, in other words, each of the light modulating regions corresponds to a waveform of the light modulating signal, and pulse start times of the waveforms of the light modulating signals are different. When the pulse start times are different, the issue that the pulse waveform on the same gate line in a conventional display panel has a higher duty ratio and results in level bar blocks along the gate lines to cause poor display is obviated.

In the present embodiment, light modulating signals for corresponding ones of the light modulating regions are controlled by an external timing logic controller.

As described above, the light modulating method provided by the present embodiment is applied to a display device, and the light modulating method comprises: acquiring a light modulating instruction, according to the light modulating instruction, partitioning a displaying region of the display device to form a plurality of light modulating regions, disposing a light modulating signal in each of the light modulating regions; wherein first electrical level duty ratios of the light modulating signals disposed in the light modulating regions are staggered. The present invention, by partitioning the displaying region, divides a gate line into different light modulating regions, and guarantees pulse start times of light modulating signals of different light modulating regions are different to prevent an over high duty ratio from occurring on the gate line and to mitigate issues of poor display images.

According to the method described by the above embodiment, the present embodiment will further make description from the view of angle of the light modulating device, the light modulating device can be implemented as an independent entity.

The present embodiment provides a light modulating device and a light modulating system.

Figure 8:
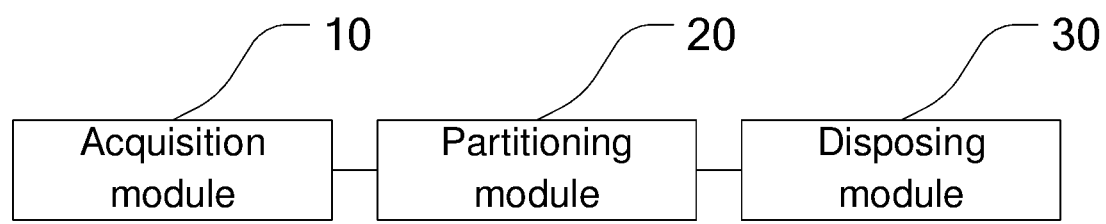
FIG. 8 is a schematic view of a light modulating device provided by the embodiment of the present invention.

With reference to FIG. 8, FIG. 8 is a schematic view of a light modulating device provided by the embodiment of the present invention. The light modulating device can be specifically integrated in a display device of a server or a terminal.

The display device acquires a light modulating instruction, and according to the light modulating instruction, partitions a displaying region of the display panel to form a plurality of light modulating regions. A light modulating signal is disposed in each of the light modulating regions, wherein first electrical level duty ratios of the light modulating signals disposed in the light modulating regions are staggered to implement light modulation for the display panel.

With reference to FIG. 8, the light modulating device can comprise: an acquisition module 10, a partitioning module 20, and a disposing module 30.

(1) Acquisition Module 10

The acquisition module 10 is configured to acquire a light modulating instruction.

In the present embodiment, the light modulating instruction is a light modulating instruction generated under preset conditions before the light modulating method provided by the embodiment of the present invention implements the light modulating method.

Figure 9:
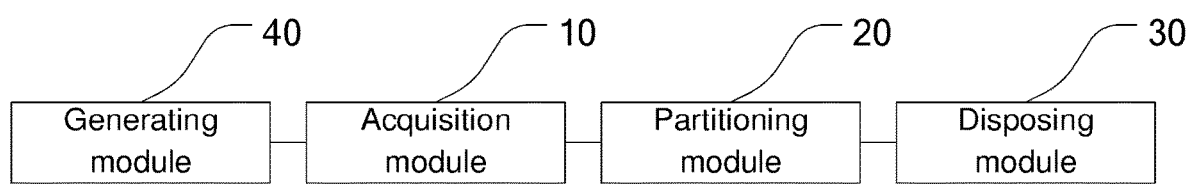
FIG. 9 is a schematic view of another light modulating device provided by the embodiment of the present invention.

In the present embodiment, the light modulating device further comprises a generating module 40, with reference to FIG. 9, FIG. 9 is a schematic view of another light modulating device provided by the embodiment of the present invention, the another light modulating device comprises a generating module 40, which is specifically configured for implement steps (01) to (03):

The step (01) comprises receiving a light modulating signal and a clock signal inputted in the displaying region.

Furthermore, the light modulating signal specifically means a PWM signal outputted by a light emitting diode in a display device, and a high/low electrical level of the PWM signal is configured to to switch on/off a driver circuit outputting a driving voltage or a driving current toward a load. Furthermore, the PWM signal is a pulse signal.

Furthermore, the clock signal specifically means a time signal of the display device controlled by an external timing logic controller, and generally the time signal is a pulse signal.

Specifically, generally a cycle of the light modulating signal is the same as a cycle of a general clock signal, and a time corresponding to a high electrical level of the clock signal comprises a sum of a time corresponding to a high electrical level of the light modulating signal and a time corresponding to a low electrical level of the light modulating signal.

The step (02) comprises calculating a ratio of an effective width of the light modulating signal to an effective width of the clock signal.

Furthermore, the effective width means a pulse width in a waveform corresponding to a signal, which is also called duty cycle. In other words, a current or a voltage corresponding to the signal has a time width of regular variation. Generally, a waveform corresponding to the signal is rectangular wave, triangular wave, jigsaw wave, sine wave, etc., such waveforms have regular variation, especially in a signal waveform of the rectangular waves, the pulse width specifically means a duty ratio, i.e., a ratio of time occupied by a pulse to a total time in a continuous working time.

Specifically, the light modulating signal and the clock signal provided by the embodiment of the present invention are pulse functions of rectangular waves. For example, when a pulse width of the light modulating signal is 1 μs and a cycle of the light modulating signal is 4 μs, an effective width corresponding to the light modulating signal is ¼=0.25. When a pulse width of the cycle signal is 4 μs and a cycle of the cycle signal is 5 μs, an effective width corresponding to the cycle signal is ⅘=0.8. Furthermore, a ratio of the effective width of the light modulating signal to the effective width of the clock signal can be 0.25/0.8=0.3125.

The step (03) comprises generating the light modulating instruction when the ratio is less than a predetermined threshold.

In the embodiment of the present invention, because in a conventional display device, especially a storage capacitor in a pixel unit changes when a device in the liquid crystal display panel is irradiated by a strong light to result in offsets of a liquid crystal charging voltage in the display panel and a threshold voltage of a driver transistor, the embodiment of the present invention can detect the effective width of the light modulating signal and the effective width of the clock signal under the strong irradiation to the display device to calculate a corresponding value as a predetermined threshold provided by the embodiment of the present invention. For example, after detection, when the predetermined threshold is set as 1, and a ratio corresponding to the embodiment of the present invention is 0.3125, it is identified that offsets of the liquid crystal charging voltage of the display device and the threshold voltage of the driver transistor occur, and therefore generation of the light modulating instruction is required to complete later light modulating steps.

(2) Partitioning Module 20

The partitioning module 20, configured to partition a displaying region of the display panel to form a plurality of light modulating regions according to the light modulating instruction.

In the present embodiment, the displaying region of the display panel is partitioned to form a plurality of light modulating regions. Specifically, the partitioning module 20 is specifically configured for implement steps (201) to (203):

The step (201) comprises determining a number of data lines in the display device, and determining a region number according to the number.

Furthermore, with reference to FIG. 5, FIG. 5 is a schematic structural view of a display panel provided by the embodiment of the present invention. Specifically, in the display device, the displaying region of the display device is an effective light emitting region of the display device, the displaying region is disposed transversely with data lines DATA, and the displaying region is disposed longitudinally with scan lines SCAN. Therefore, the number of the data lines DATA in the display device is determined, and the region number is determined according to the number. In FIG. 5, a plurality of regions of area1, area2, . . . area n−1, area n are classified.

For example, the number of the data lines is identified as 10, the region number of the embodiment of the present invention is identified, and the region number relates to the number of the data lines DATA. Preferably, the region number can correspond to the number of the datalines DATA, for example, the region number is 5, 10, or 20.

The step (202) comprises acquiring a first length of the displaying region along gate lines.

Specifically, the first length along the gate lines in the displaying region is a side length of the displaying region in the display panel, Specifically, with reference to FIG. 5, the first length is a length L1 corresponding to the displaying region.

The step (203) comprises partitioning the displaying region according to the first length and the region number.

For example, when the first length is determined to be 10 cm and the region number is 20, it is calculated that a partition number corresponding to the first length is a common divisor for 20, for example, the common divisor is 5. The displaying region can be divided longitudinally, and a specific schematic dividing view refers to FIG. 4. It should be explained that, to guarantee an excellent effect of the displaying region, the greater region number is better.

Furthermore, the (203) specifically comprises steps (2031) and (2032):

The step (2031) comprises calculating a first unit length according to the first length and the region number.

For example, when the first length is determined to be 10 cm and the region number is 20, it is calculated that a partition number corresponding to the first length is a common divisor for 20, for example, the common divisor is 5. The displaying region can be equally divided to calculate out the first unit length to be 10/5=2 cm, and a side edge of each of the light modulating regions is 2 cm.

The step (2032) comprises according to the first unit length, partitioning the displaying region along the gate lines into a plurality of regions amounting to the region number.

For example, when the first unit length is determined as 2 cm, the displaying region can be equally divided according to the first length L1.

Besides the step of equal division according to the first length provided by the above embodiment, the step (203) can further comprise steps (2033) to (2035):

The step (2033) comprises acquiring a second length of the displaying region along the datalines.

With reference to FIG. 5, the second length L2 is a length of the displaying region along the gate lines, i.e., the width of the displaying region in FIG. 5.

The step (2034) comprises calculating a second unit length according to the second length and the region number.

In the embodiment, the second unit length is an equally divided unit length corresponding to the embodiment of the present invention. For example, when the second length is 8 cm, the region number is 20, and the partition number corresponding to the first length as determined above is 5, then it is determined that a partition length corresponding to the second length is 20/5=4. Then according to the partition length corresponding to the second unit and the second length, the second unit length is 8/4=2 cm.

The step (2035) comprises according to the second unit length, partitioning the displaying region along the data lines into a plurality of regions amounting to the region number.

Furthermore, a specific partitioning method refers to FIG. 6, FIG. 6 is another schematic structural view of a display panel provided by the embodiment of the present invention. According to the second unit length L2, the displaying region is partitioned along the datalines DATA into a plurality of regions amounting to the region number such that the displaying region is divided into partitions in grids. In the embodiment, a number of scan lines SCAN is combined, when the first unit length is 2 cm, it is calculated that a length corresponding to a unit region of the light modulating regions is 2 cm, and a width corresponding to the unit region 2 cm. The displaying region can be divided into partitions in grids to partition the displaying region. Along the scan lines SCAN the display panel can be divided into area11, area12, . . . area 1$n$-1, area1$n$, and along the data lines DATA, the display panel can be divided into area11, area21, . . . area (n-1) 1, area n1.

(2) Disposing Module 30

The disposing module 30, configured to dispose a light modulating signal in each of the light modulating regions, wherein first electrical level duty ratios of the light modulating signals disposed in the light modulating regions are staggered.

Furthermore, with reference to FIG. 7, FIG. 7 is a schematic time chart of a light modulating signal of the embodiment of the present invention. A high/low electrical level of the light modulating signal switch on/off a driver circuit outputting a driving voltage or a driving current toward a load. Specifically, when the light modulating signal is in the high electrical level, the displaying region emits light. Specifically, a raising time of the high electrical level is a pulse start time of the light modulating signal.

For example, when the region number is set as n, in other words, each of the light modulating regions corresponds to a waveform of the light modulating signal, and pulse start times of the waveforms of the light modulating signals are different. When the pulse start times are different, the issue that the pulse waveform on the same gate line in a conventional display panel has a higher duty ratio and results in level bar blocks along the gate lines to cause poor display is obviated.

In the present embodiment, light modulating signals for corresponding ones of the light modulating regions are controlled by an external timing logic controller.

As described above, the light modulating device provided by the present embodiment is applied to a display device, and the light modulating device comprises: an acquisition module 10 configured to acquire a light modulating instruction, a partitioning module 20 configured to partition a displaying region of the display panel to form a plurality of light modulating regions according to the light modulating instruction, a disposing module 30, configured to dispose a light modulating signal in each of the light modulating regions, wherein first electrical level duty ratios of the light modulating signals disposed in the light modulating regions are staggered. The present invention, by partitioning the displaying region, divides a gate line into different light modulating regions, and guarantees pulse start times of light modulating signals of different light modulating regions are different to prevent an over high duty ratio from occurring on the gate line and to mitigate issues of poor display images.

In the specific implementation, each of the above units or structures may be implemented as a separate entity, or may be any combination, and implemented as the same entity or a plurality of entities. The specific implementation of the above units or structures refer to the previous method embodiment and will not be described repeatedly.

A person of ordinary skill in the art can understand that all or parts of the steps of each method in the above embodiment can be completed through instructions, or through related hardware controlled by the instructions. The instructions can be stored in a computer readable storage medium, and is loaded and implemented by a processor. Accordingly, the embodiment of the present invention provides a storage medium, the storage medium is stored with a plurality of instructions, the instructions can be loaded by a processor to implement steps of any light modulating method provided by the embodiment of the present invention.

The storage medium can comprise: a read only memory (ROM), a random access memory (RAM), a floppy disk, or a compact disc.

Because the instructions stored in the storage medium can implement steps of any light modulating method provided by the embodiment of the present invention. Therefore, advantages that any light modulating method provided by the embodiment of the present invention can achieve can be achieved, as described in the above embodiment, which is not be described repeatedly herein.

The specific implementation of the above units or structures refer to the previous method embodiment and will not be described repeatedly.

Although the preferred embodiments of the present invention have been disclosed as above, the aforementioned preferred embodiments are not used to limit the present invention. The person of ordinary skill in the art may make various changes and modifications without departing from the spirit and scope of the present invention. Therefore, the scope of protection of the present invention is defined by the scope of the claims.

What is claimed is:

1. A light modulating method, applied to a display device, wherein the light modulating method comprises steps as follows:
   acquiring a light modulating instruction;
   according to the light modulating instruction, partitioning a displaying region of the display device to form a plurality of light modulating regions; and
   disposing a light modulating signal in each of the light modulating regions;
   wherein first electrical level duty ratios of the light modulating signals disposed in the light modulating regions are staggered;
   wherein the step of partitioning the displaying region comprises:
   determining a number of data lines in the display device, and determining a region number according to the number;
   acquiring a first length of the displaying region along gate lines disposed in the display device; and
   partitioning the displaying region according to the first length and the region number.

2. The light modulating method as claimed in claim 1, wherein before the step of acquiring a light modulating instruction step, the method further comprises:
   receiving a light modulating signal and a clock signal inputted in the displaying region;
   calculating a ratio of an effective width of the light modulating signal to an effective width of the clock signal;
   generating the light modulating instruction when the ratio is less than a predetermined threshold.

3. The light modulating method as claimed in claim 1, wherein the step of partitioning the displaying region according to the first length and the region number comprises:
   calculating a first unit length according to the first length and the region number; and
   according to the first unit length, partitioning the displaying region along the gate lines into a plurality of regions amounting to the region number.

4. The light modulating method as claimed in claim 1, wherein the step of partitioning the displaying region according to the first length and the region number further comprises:
   acquiring a second length of the displaying region along the data lines;
   calculating a second unit length according to the second length and the region number; and
   according to the second unit length, partitioning the displaying region along the data lines into a plurality of regions amounting to the region number.

5. A light modulating device, wherein the light modulating device comprises:
   an acquisition module, configured to acquire a light modulating instruction;
   a partitioning module, configured to partition a displaying region of the display panel to form a plurality of light modulating regions according to the light modulating instruction, wherein the partitioning module comprises:
   determining a number of data lines in a display device, and determining a region number according to the number; acquiring a first length of the displaying region along gate lines disposed in the display device; and partitioning the displaying region according to the first length and the region number; and
   a disposing module, configured to dispose a light modulating signal in each of the light modulating regions;
   wherein first electrical level duty ratios of the light modulating signals disposed in the light modulating regions are staggered.

6. The light modulating device as claimed in claim 5, wherein the partitioning module is configured for:
   calculating a first unit length according to the first length and the region number; and
   according to the first unit length, partitioning the displaying region along the gate lines disposed in the display device into a plurality of regions amounting to the region number.

7. The light modulating device as claimed in claim 5, wherein the partitioning module is further configured for:
   acquiring a second length of the displaying region along the data lines;
   calculating a second unit length according to the second length and the region number; and
   according to the second unit length, partitioning the displaying region along the data lines into a plurality of regions amounting to the region number.

* * * * *